US012583374B2

(12) United States Patent
Kawashima et al.

(10) Patent No.: US 12,583,374 B2
(45) Date of Patent: Mar. 24, 2026

(54) HANDRAIL FOR RAILROAD VEHICLE AND METHOD FOR CHANGING NATURAL FREQUENCY OF SAID HANDRAIL

(71) Applicant: Kawasaki Railcar Manufacturing Co., Ltd., Kobe (JP)

(72) Inventors: Takahiro Kawashima, Kobe (JP); Yu Yamamoto, Kobe (JP); Satoru Akiyama, Kobe (JP); Hiroshi Enomoto, Kobe (JP)

(73) Assignee: Kawasaki Railcar Manufacturing Co., Ltd., Kobe (JP)

( * ) Notice: Subject to any disclaimer, the term of this patent is extended or adjusted under 35 U.S.C. 154(b) by 494 days.

(21) Appl. No.: 18/357,010

(22) Filed: Jul. 21, 2023

(65) Prior Publication Data

US 2023/0356641 A1 Nov. 9, 2023

Related U.S. Application Data

(63) Continuation of application No. PCT/JP2022/002150, filed on Jan. 21, 2022.

(30) Foreign Application Priority Data

Jan. 22, 2021 (JP) ................................. 2021-008417

(51) Int. Cl.
*B60N 3/02* (2006.01)
*B61D 37/00* (2006.01)
(Continued)

(52) U.S. Cl.
CPC .............. *B60N 3/02* (2013.01); *B60N 3/023* (2013.01); *B60N 3/026* (2013.01); *B61D 37/00* (2013.01);
(Continued)

(58) Field of Classification Search
CPC .......... B60N 3/02; B60N 3/023; B60N 3/026; B61D 37/00; B61D 49/00; E04F 11/18; E04F 11/1808; E04F 11/1836; E04F 11/1868; B63B 17/04; E01D 19/10; E01F 13/00; E01F 15/00
(Continued)

(56) References Cited

U.S. PATENT DOCUMENTS 1,010,133 A * 11/1911 Fleming ................... B60N 3/02
105/354

FOREIGN PATENT DOCUMENTS

CN 102887093 A * 1/2013 ............. B60N 2/245
CN 206924204 U * 1/2018 ............... A61L 2/20
(Continued)

OTHER PUBLICATIONS

International Search Report issued in PCT/JP2022/002150; mailed Mar. 8, 2022.

*Primary Examiner* — S. Joseph Morano
*Assistant Examiner* — James William Jones
(74) *Attorney, Agent, or Firm* — Studebaker Brackett PLLC

(57) ABSTRACT

A handrail for a railroad vehicle is disposed in a cabin of a vehicle body of the railroad vehicle. The handrail includes a handrail body whose inside serves as a filling space and a filler having fluidity and filling the filling space. The handrail body includes an opening to be used in supplying the filler to the filling space and a plug that opens and closes the opening.

5 Claims, 3 Drawing Sheets

(51) Int. Cl.

| | | |
|---|---|---|
| B61D 49/00 | (2006.01) | |
| *B63B 17/04* | (2006.01) | |
| *E01D 19/10* | (2006.01) | |
| *E01F 13/00* | (2006.01) | |
| *E01F 15/00* | (2006.01) | |
| *E04F 11/18* | (2006.01) | |

(52) U.S. Cl.
CPC .............. B61D 49/00 (2013.01); *B63B 17/04* (2013.01); *E01D 19/10* (2013.01); *E01F 13/00* (2013.01); *E01F 15/00* (2013.01); *E04F 11/18* (2013.01); *E04F 11/1808* (2013.01); *E04F 11/1836* (2013.01)

(58) Field of Classification Search
USPC ........................................................ 105/354
See application file for complete search history.

(56) References Cited

FOREIGN PATENT DOCUMENTS

| CN | 110696861 | A | * | 1/2020 | ............ | B61D 37/00 |
|---|---|---|---|---|---|---|
| JP | 5483437 | B2 | | 5/2014 | | |
| JP | 2015054147 | A | * | 3/2015 | | |
| JP | 2016068614 | A | * | 5/2016 | | |
| WO | WO-2016041812 | A1 | * | 3/2016 | ............ | B60N 3/026 |
| WO | WO-2018189879 | A1 | * | 10/2018 | ............ | B61D 49/00 |

* cited by examiner

VEHICLE HEIGHT DIRECTION

VEHICLE LONGITUDINAL DIRECTION

VEHICLE HEIGHT DIRECTION

VEHICLE TRANSVERSE DIRECTION

HANDRAIL FOR RAILROAD VEHICLE AND METHOD FOR CHANGING NATURAL FREQUENCY OF SAID HANDRAIL

CROSS-REFERENCE TO RELATED APPLICATION

The present application is a bypass continuation of PCT/JP2022/002150, filed in Japan on Jan. 21, 2022, the entire contents of which is hereby incorporated by reference in its entirety.

FIELD

The technique of the present disclosure relates to a handrail for a railroad vehicle and a method for changing a natural frequency thereof.

SUMMARY

In accordance with the present disclosure, a handrail for a railroad vehicle disposed in a cabin of a vehicle body of the railroad vehicle, and the handrail includes: a hollow member whose inside serves as a filling space; and a filler having fluidity and filling the filling space. The hollow member includes at least one of an opening to be used in supplying the filler to the filling space to change a filling amount in the filling space or an opening to be used in removing the filler from the filling space to change the filling amount in the filling space, and a plug that opens and closes the opening.

DESCRIPTION OF EMBODIMENTS

The inventor of the present disclosure has recognized that, to avoid resonance of the handrail, it is effective to produce a handrail with a natural frequency different from a resonance frequency (i.e., frequency of a vibration source).

However, it is difficult in some cases to know the frequency of the vibration source beforehand, and in these cases, fabrication of a handrail with a natural frequency different from a resonance frequency beforehand is difficult. In the case of handrails used in railroad vehicles, for example, handrails with the same shape and the same weight are used in vehicles, whereas different devices as vibration sources are used among the vehicles. Thus, the resonance frequency is different among the vehicles. Accordingly, there can occur a case where handrails in some vehicles do not resonate and handrails in other vehicles resonate. In such a case, a conventional technique changes the natural frequency by performing a process such as increase/decrease of the thickness of the pipe, which takes considerable effort.

The inventor has developed technologies as explained in the present disclosure is to address these problems, so as to easily change a natural frequency.

Another aspect according to the present disclosure is a method for changing a natural frequency of a handrail for a railroad vehicle disposed in a cabin of a vehicle body of the railroad vehicle, and the handrail includes a hollow member whose inside serves as a filling space, the hollow member includes an opening that allows the filling space to communicate with outside, and a plug that opens and closes the opening. The method for changing a natural frequency includes: opening the opening; supplying a filler to the filling space through the opening or removing a filler filling the filling space through the opening; and closing the opening.

According to a method for changing a natural frequency of a handrail for a railroad vehicle, a natural frequency can be easily changed.

Exemplary embodiments will be described in detail hereinafter with reference to the drawings.

Figure 1:
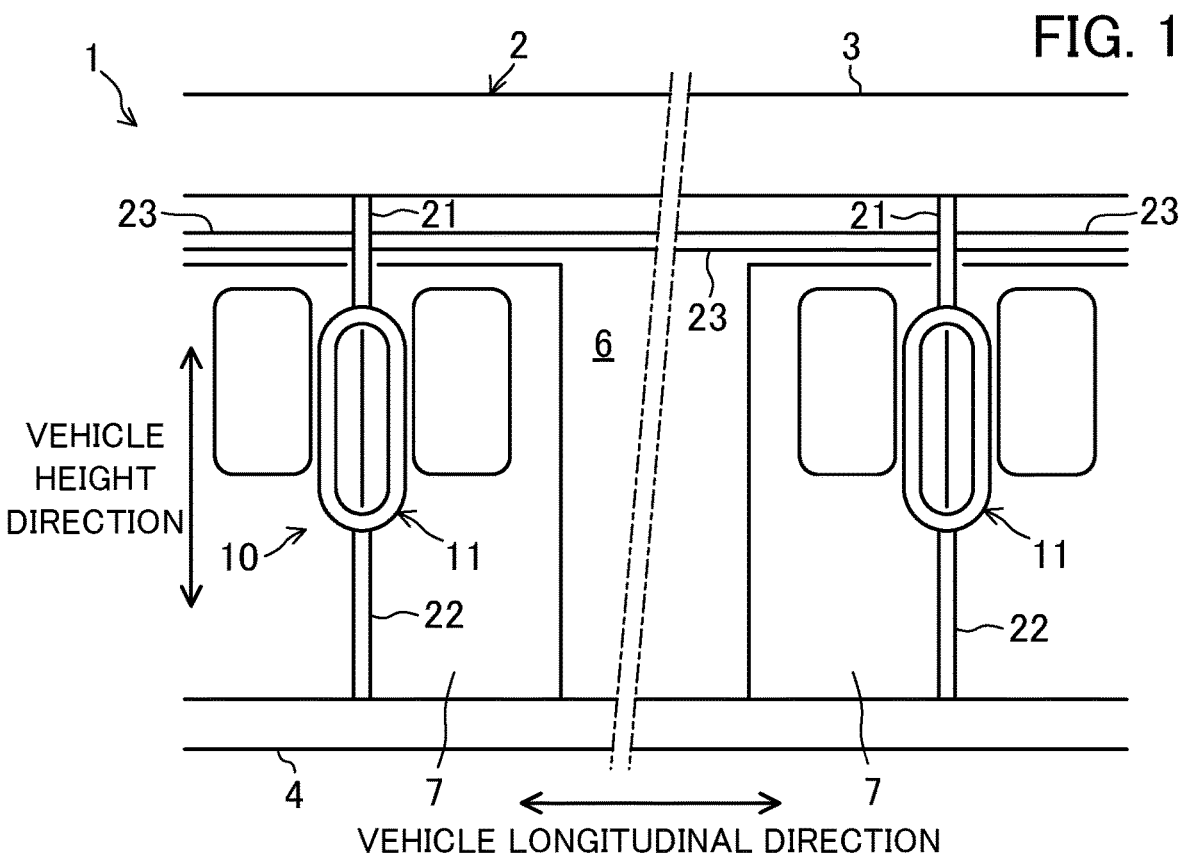
FIG. 1 is a schematic cross-sectional view illustrating a railroad vehicle seen in a vehicle longitudinal direction.
Figure 2:
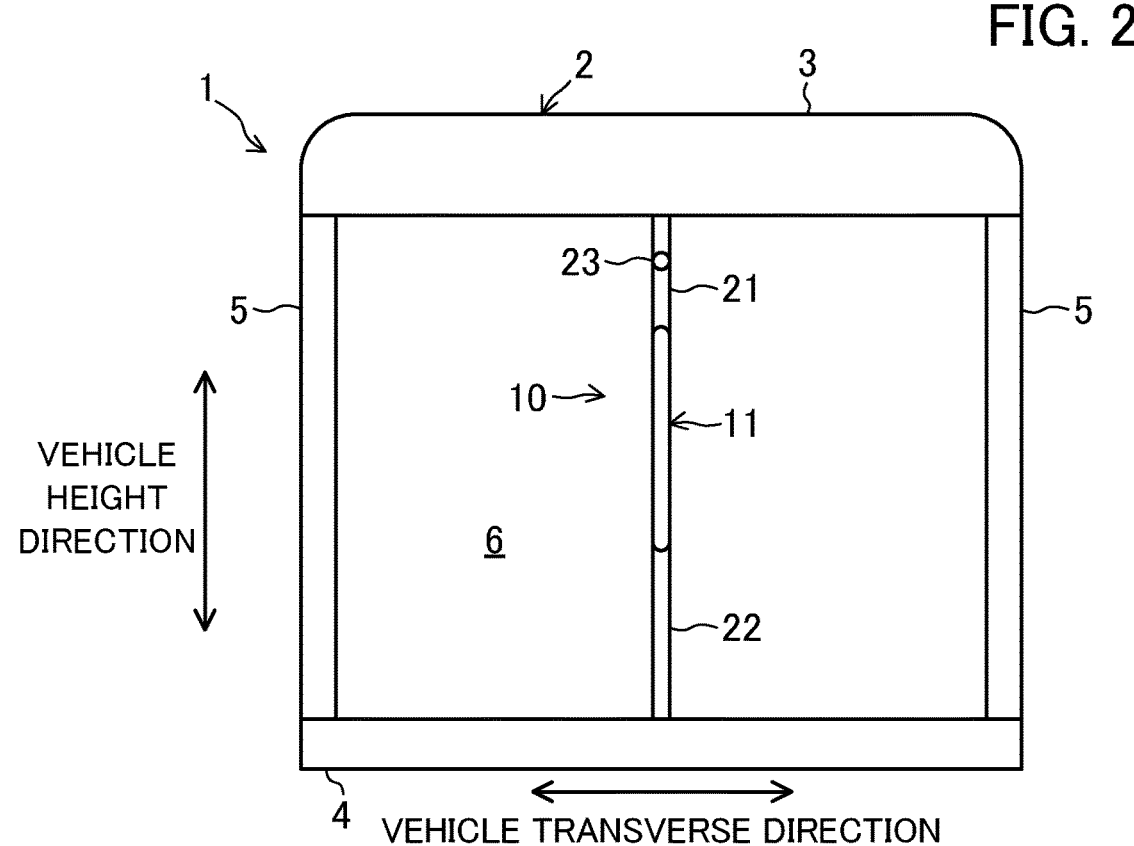
FIG. 2 is a schematic cross-sectional view illustrating the railroad vehicle seen in a vehicle transverse direction.

FIG. 1 is a schematic cross-sectional view illustrating a railroad vehicle 1 seen in a vehicle longitudinal direction. FIG. 2 is a schematic cross-sectional view illustrating the railroad vehicle 1 seen in a vehicle transverse direction.

The railroad vehicle 1 includes a vehicle body 2. The vehicle body 2 includes a roof 3, a floor 4, and two side walls 5. The two side walls 5 connect the roof 3 and the floor 4. An internal space of the vehicle body 2, that is, a space defined by the roof 3, the floor 4, and the two side walls 5, serves as a cabin 6.

The railroad vehicle 1 includes a handrail 10. Specifically, the handrail 10 is a handrail for the railroad vehicle 1 disposed in the cabin 6 of the vehicle body 2. In this embodiment, the handrail 10 is used for a standing passenger to support his/her body.

Figure 3:
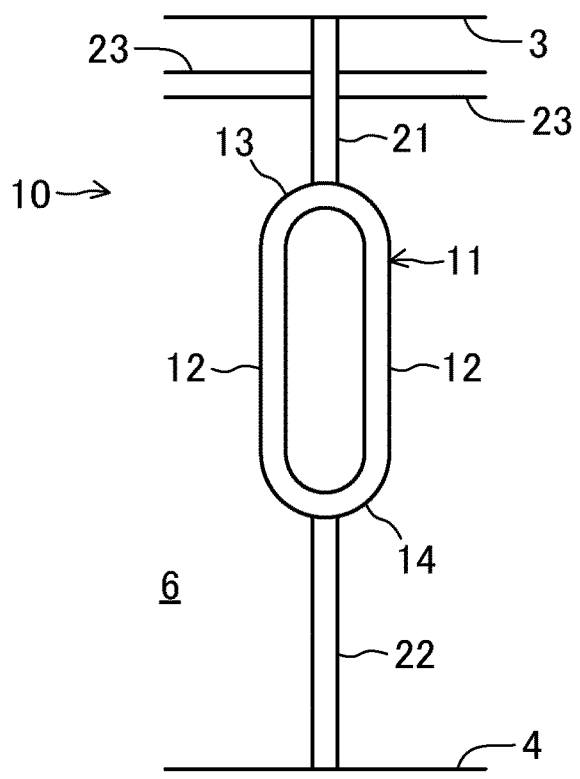
FIG. 3 is a front view illustrating a handrail seen in the vehicle longitudinal direction.
Figure 4:
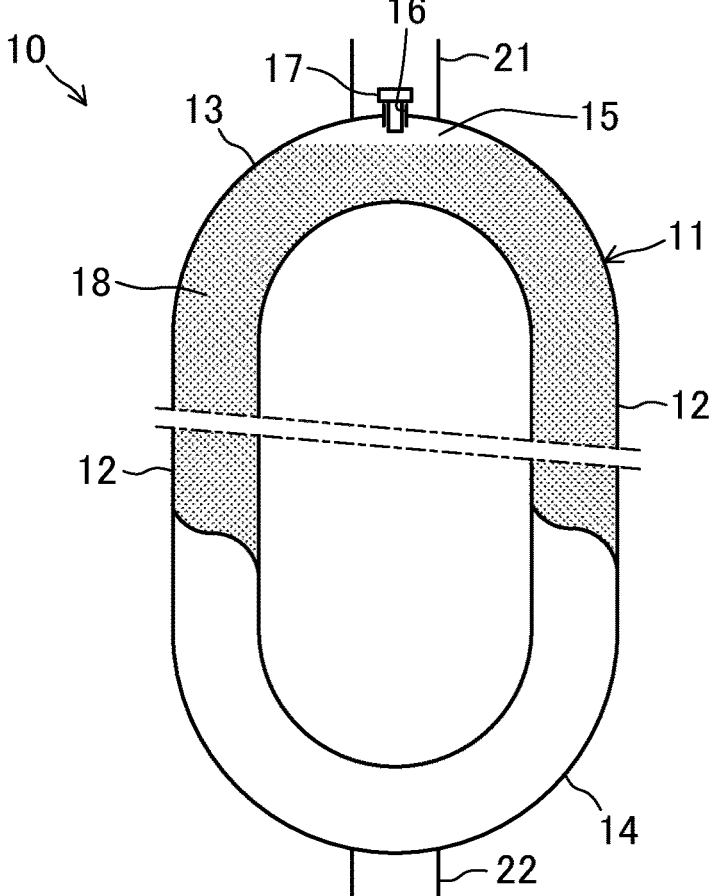
FIG. 4 is a partial cross-sectional view illustrating a main portion of the handrail.

FIG. 3 is a front view illustrating the handrail 10 seen in the vehicle longitudinal direction. FIG. 4 is a partial cross-sectional view illustrating a main portion of the handrail 10. As also illustrated FIGS. 3 and 4, the handrail 10 includes a handrail body 11, a filler 18, an upper support 21, and a lower support 22.

The handrail body 11 is a portion mainly gripped by a passenger. The handrail body 11 is located in a space of the cabin 6 facing a door 7 (see FIG. 1), and located at a center in a vehicle longitudinal direction (see FIG. 2).

The handrail body 11 is a hollow member whose inside serves as a filling space 15. Specifically, the handrail body 11 is an annular pipe (e.g., stainless pipe, the same holds for the following pipes). More specifically, the handrail body 11 has an oval annular shape elongated in a vehicle height direction (i.e., vertical direction).

That is, the handrail body 11 includes two arc portions (an upper arc portion 13 and a lower arc portion 14) and two straight portions 12 connecting these two arc portions. The lower arc portion 14 is located below the upper arc portion 13. The upper arc portion 13 and the lower arc portion 14 are semicircles having the same radius. The two straight portions 12 extend in parallel in the vehicle height direction. The upper arc portion 13 and the lower arc portion 14 are examples of curved portions.

The internal space of the thus-formed handrail body 11 is the filling space 15. That is, the filling space 15 are a closed annular space. The filling space 15 are a space filled with the filler 18. The filler 18 has fluidity, and in this embodiment, metal granules or powder is used as the filler 18. The filler 18 may be a liquid, a gelled viscous body, other substances.

The handrail body 11 has an opening 16 capable of being opened and closed to supply the filler 18 to the filling space 15. The opening 16 is disposed in the upper arc portion 13. More specifically, the opening 16 is disposed at a center of the upper arc portion 13. The opening 16 is also disposed in a highest portion of the handrail body 11 (filling space 15). The opening 16 allows the filling space 15 to communicate with the outside. The opening 16 is open in the vehicle height direction (vertical direction).

A plug 17 that opens and closes the opening 16 is detachably attached to the handrail body 11. When the plug 17 is attached to the opening 16 (close), the opening 16 is closed, whereas when the plug 17 is removed from the opening 16 (open), the opening 16 is opened. In this manner, the opening 16 is opened and closed. In this embodiment, the opening 16 is a screw hole, and the plug 17 is a bolt that is screwed to the opening 16.

The upper support 21 and the lower support 22 support the handrail body 11. The upper support 21 and the lower support 22 are pipes linearly extending in the vehicle height direction. The lower support 22 is connected to the handrail body 11 and the floor 4. More specifically, the lower support 22 has a lower end fixed to the floor 4 and an upper end joined to a center of the lower arc portion 14 of the handrail body 11. The upper support 21 is a coupler coupled to the handrail body 11 to cover the opening 16 and the plug 17. The upper support 21 is connected to the handrail body 11 and the roof 3. More specifically, the upper support 21 has an upper end fixed to the roof 3 and a lower end joined to an apex (center) of the upper arc portion 13 of the handrail body 11. In this manner, the opening 16 and the plug 17 are covered with the upper support 21 so that the opening 16 and the plug 17 are thereby concealed, and thus, appearance of the handrail 10 is not impaired.

Each of the handrail body 11, the upper support 21, and the lower support 22 are arranged in multiple pieces in the vehicle transverse direction in the cabin 6. The handrail 10 includes a connecting portion 23 connecting adjacent upper supports 21. The connecting portion 23 is a pipe linearly extending in the vehicle transverse direction. In this manner, the presence of the upper support 21, the lower support 22, and the connecting portion 23 obtain necessary stiffness of the entire handrail 10.

In the thus-configured handrail 10, the filling space 15 is filled with the filler 18 from the opening 16 so that the weight of the entire handrail 10 thereby changes (increases). The change (increase) in the weight of the entire handrail 10 changes (reduces) a natural frequency of the handrail 10. That is, the handrail 10 changes the natural frequency of the handrail 10 by changing the amount (filling amount) of the filler 18 in the filling space 15, that is, by changing the weight of the handrail 10.

<Method for Changing Natural Frequency>

Figure 5:
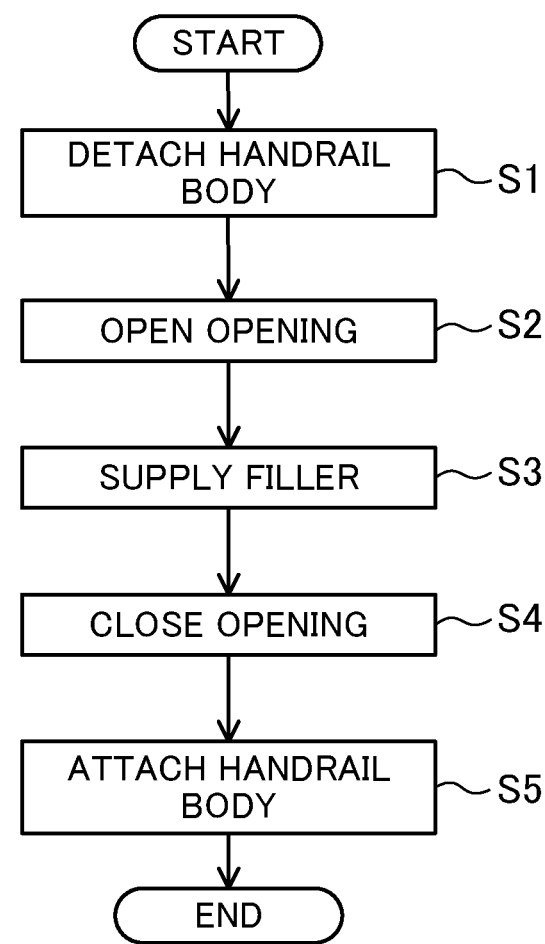
FIG. 5 is a flowchart depicting a method for changing a natural frequency of the handrail.

A method for changing the natural frequency of the handrail 10 for the railroad vehicle 1 configured as described above will be described with reference to FIG. 5. FIG. 5 is a flowchart depicting a method for changing the natural frequency of the handrail 10.

First, before the method for changing the natural frequency is performed, the handrail 10 is attached to a target railroad vehicle 1. Specifically, the upper support 21 is fixed to the roof 3, the lower support 22 is fixed to the floor 4, and the handrail body 11 is joined (welded) to the upper support 21 and the lower support 22. At this time, the handrail body 11 is in a state where the filling space 15 is not filled with the filler 18 at all or a state where the filling space 15 is filled with a certain amount of the filler 18 (i.e., a state where the filling space 15 is not full).

Then, it is determined whether the handrail 10 resonates or not based on vibrations of the vehicle body 2, that is, vibrations of a device (vibration source) mounted on the vehicle body 2. If the handrail 10 resonates, the natural frequency of the handrail 10 is changed to be different from a resonance frequency. That is, the natural frequency is changed as shown in FIG. 5. In this embodiment, the method for changing the natural frequency includes: detaching the handrail body 11; opening the opening 16, supplying the filler 18 to the filling space 15 through the opening 16; closing the opening 16; and attaching the handrail body 11.

First, a detachment action of detaching the handrail body 11 is performed (step S1). Specifically, in the detachment action, the handrail body 11, the upper support 21, and the lower support 22 that are joined together are detached as one unit from the vehicle body 2. Hereinafter, the handrail body 11, the upper support 21, and the lower support 22 as one unit will also be referred to as the handrail body 11 and other members.

More specifically, in the detachment action, first, the upper support 21 and the two connecting portion 23 are separated from each other. Next, the handrail body 11 and other members are lifted so that the lower support 22 is thereby separated from the floor 4. Subsequently, the handrail body 11 and other members are slightly tilted and pulled down so that the upper support 21 is thereby separated from the roof 3. In this manner, the handrail body 11 and other members are detached from the vehicle body 2.

After the handrail body 11 and other members are detached from the vehicle body 2, an opening action of opening the opening 16 of the handrail body 11 is performed (step S2). That is, the plug 17 is removed from the opening 16 so that the opening 16 is thereby opened. Specifically, in the opening action, a tool or another member is inserted in the upper support 21, and the plug 17 is removed. Subsequently, a filling action of supplying the filler 18 to the filling space 15 through the opening 16 is performed (step S3). Specifically, in the filling action, the filler 18 is poured into the upper support 21. The filler 18 poured into the upper support 21 flows from the opening 16 to the filling space 15 and fills the filling space 15. At this time, since the opening 16 is disposed in the upper arc portion 13, the filler 18 is approximately evenly distributed to the two straight portions 12 from the upper arc portion 13. Accordingly, the filling space 15 is uniformly filled with the filler 18.

By performing the filling action described above, the filling amount in the filling space 15 increases, and the weight of the handrail body 11, and further, the weight of the entire handrail 10, increases. Accordingly, the natural frequency of the handrail 10 decreases, and the natural frequency of the handrail 10 and the resonance frequency (frequency of the vibration source) become different from each other. In this manner, resonance of the handrail 10 is avoided.

Thereafter, a closing action of closing the opening 16 is performed (step S4). That is, the plug 17 is attached to the opening 16 so that the opening 16 is thereby closed. Specifically, in the closing action, a tool or another member is inserted in the upper support 21, and the plug 17 is attached. Subsequently, an attachment action of attaching the handrail body 11 and other members to the vehicle body 2 again is performed (step S5). That is, when the upper support 21 is coupled to the roof 3 and to the two connecting portions 23, and the lower support 22 is coupled to the floor 4. In the foregoing manner, the handrail 10 that does not resonate is disposed in the railroad vehicle 1.

In the manner described above, the handrail 10 for the railroad vehicle 1 according to this embodiment is disposed in the cabin 6 of the vehicle body 2 of the railroad vehicle 1, and includes: the handrail body 11 (hollow member) whose inside serves as the filling space 15; and the filler 18 having fluidity and filling the filling space 15. The handrail body 11 has the opening 16 to be used in supplying the filler 18 to the filling space 15, and the plug 17 for opening and closing the opening 16.

The method for changing a natural frequency of the handrail 10 for the railroad vehicle 1 according to this embodiment is a method for changing the natural frequency of the handrail 10 including the handrail body 11 (hollow member) whose inside serves as the filling space 15, and the handrail body 11 includes the opening 10 that allows the filling space 15 to communicate with outside, and the plug 17 for opening and closing the opening 16, and the handrail 10 is disposed in the cabin 6 of the vehicle body 2 of the railroad vehicle 1. The method for changing the natural frequency includes: opening the opening 16; supplying the filler 18 to the filling space 15 through the opening 16; and closing the opening 16.

With these configurations, if it is determined that the handrail 10 resonates, the opening 16 of the handrail body 11 is opened and the filler 18 is supplied to the filling space 15 so that the weight of the handrail 10 can be thereby increased. Since the filler 18 has fluidity, the filler 18 can be easily supplied to the filling space 15. The increase in the weight of the handrail 10 reduces (changes) the natural frequency of the handrail 10. In this manner, the natural frequency of the handrail 10 can be easily changed. Thus, even in a case where the frequency of the vibration source is not known at the beginning, resonance of the handrail 10 can be easily avoided.

In addition, since the handrail 10 is disposed in the cabin 6 of the railroad vehicle 1, even if the frequency of the vibration source differs among vehicles, the natural frequency of the handrail 10 can be easily changed to a frequency different from a resonance frequency for each vehicle. Thus, it is possible to avoid effort of refabricating the handrails 10 from the beginning.

In the handrail 10 according to this embodiment, the handrail body 11 includes the upper arc portion 13 (curved portion). The opening 16 is disposed in the upper arc portion 13.

With the configuration described above, since the opening 16 is disposed in the upper arc portion 13, the filler 18 can be approximately evenly distributed to the two straight portions 12 from the upper arc portion 13. Accordingly, the filling space 15 can be uniformly filled with the filler 18. Thus, as compared to a case where the filler is locally distributed in the filling space 15, the range of change in the weight of the handrail 10 can be increased. Consequently, the range of change of the natural frequency can also be increased, and the natural frequency of the handrail 10 is reliably made different from the resonance frequency.

The handrail 10 according to this embodiment further includes the upper support 21 (coupler) coupled to the handrail body 11 to cover the opening 16 and the plug 17.

With the configuration described above, the opening 16 and the plug 17 can be concealed in appearance by the upper support 21. Thus, it is possible to prevent impairing of appearance of the handrail 10 due to exposure of the opening 16 and other members to the outside.

In the handrail 10 according to this embodiment, the filler 18 is metal granules or powder.

With the configuration described above, since metal granules or powder has a relatively large specific gravity, the amount of change in the weight of the handrail 10 can be increased even with a small filling amount. Thus, a filling action of the filler 18 is easily performed.

Other Embodiments

In the foregoing description, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components included in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, in the handrail 10 according to this embodiment, the opening 16 is used in supplying the filler 18 to the filling space 15. Alternatively, the opening 16 may be used in removing the filler 18 from the filling space 15. In this case, the opening 16 of the handrail body 11 is opened and the filler 18 filling the filling space 15 is removed from the opening 16 so that the weight of the handrail 10 can be thereby reduced. Accordingly, the natural frequency of the handrail 10 is increased to be made different from the resonance frequency. In this manner, the natural frequency of the handrail 10 can be easily changed.

The handrail body 11 according to this embodiment may include both an opening to be used in supplying the filler 18 to the filling space 15 and an opening to be used in removing the filler 18 from the filling space 15.

The handrail body 11 may have an annular shape other than the oval annular shape described above. For example, the handrail body 11 may have an ellipse or egg annular shape.

The handrail body 11 may be branched into branched portions. In this case, the openings 16 are preferably disposed in the branched portions. Since the openings 16 are disposed in the branched portions, the filler 18 may be distributed to the branched portions through the openings 16. Thus, the filling space can be uniformly filled with the filler.

The handrail body 11 may have any shape as long as the inside of the handrail body 11 is a hollow member whose inside serves as the filling space 15.

In the handrail 10 according to this embodiment, the hollow member whose inside serves as the filling space 15 is only the handrail body 11. Alternatively, the upper support 21 and the lower support 22 may also be the hollow members. Alternatively, instead of the handrail body 11, the upper support 21 or the lower support 22 may be the hollow member.

In the handrail 10 according to this embodiment, the opening 16 may be disposed in the lower arc portion 14. In this case, the detached handrail body 11 is flipped upside down so that the filler 18 can be easily supplied to the filling space 15 in a manner similar to the case of disposing the opening 16 in the upper arc portion 13. Then, in this case, the lower support 22 may be coupled to the handrail body 11 to cover the opening and the plug disposed in the lower arc portion 14. That is, the lower support 22 may be used as a coupler.

Figure 6:
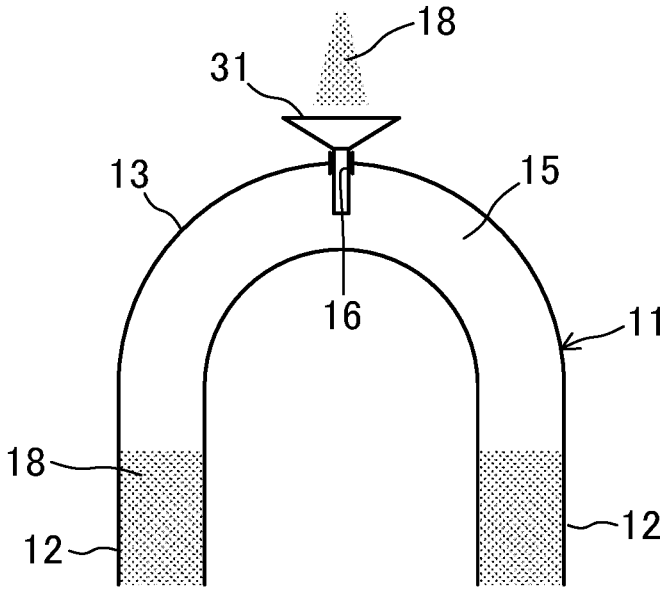
FIG. 6 is a cross-sectional view illustrating a main portion of a handrail in a filling action according to another embodiment.

In the handrail 10 according to this embodiment, in changing the natural frequency, the filler 18 is supplied through the upper support 21. Alternatively, the filler 18 may be supplied directly from the opening 16 by separating the handrail body 11 and the upper support 21 from each other. In this case, as illustrated in FIG. 6, the use of a funnel 31 enables efficient filling of the filler 18. FIG. 6 is a cross-sectional view illustrating a main portion of a handrail 10 in a filling action according to another embodiment.

In a case where the opening 16 and the plug 17 have shapes and other features not impairing appearance of the handrail 10, the opening 16 and the plug 17 may be disposed at positions exposed in appearance in the handrail body 11.

In the handrail 10 according to this embodiment, the weight of the handrail 10 is changed by changing the filling amount of the filler 18. Alternatively, the weight of the handrail 10 may be changed by changing the size of granules of the filler 18 or changing a material of the filler 18.

What is claimed is:

1. A handrail for a railroad vehicle, the handrail being disposed in a cabin of a vehicle body of the railroad vehicle, the handrail comprising:

a hollow member whose inside serves as a filling space; and a filler having fluidity and filling the filling space, wherein the hollow member includes at least one of an opening to be used in supplying the filler to the filling space to change a filling amount in the filling space or an opening to be used in removing the filler from the filling space to change the filling amount in the filling space, and a plug that opens and closes the opening.

2. The handrail according to claim 1, wherein the hollow member has a curved portion or a branched portion, and the opening is disposed in the curved portion or the branched portion.

3. The handrail according to claim 1, further comprising a coupler that is coupled to the hollow member to cover the opening and the plug.

4. The handrail according to claim 1, wherein the filler is metal granules or powder.

5. A method for changing a natural frequency of a handrail for a railroad vehicle, the handrail being disposed in a cabin of a vehicle body of the railroad vehicle, the handrail including a hollow member whose inside serves as a filling space, the hollow member includes an opening that allows the filling space to communicate with outside, and a plug that opens and closes the opening, the method comprising:

opening the opening;

supplying a filler to the filling space through the opening or removing a filler filling the filling space through the opening; and closing the opening.

* * * * *